United States Patent
Greeff et al.

(10) Patent No.: US 6,356,106 B1
(45) Date of Patent: Mar. 12, 2002

(54) ACTIVE TERMINATION IN A MULTIDROP MEMORY SYSTEM

(75) Inventors: Roy Greeff; Terry R. Lee; Ron Harrison, all of Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/659,334

(22) Filed: Sep. 12, 2000

(51) Int. Cl.[7] ..................... H03K 19/0175; H03K 17/16
(52) U.S. Cl. ............................ 326/30; 326/86; 326/90; 710/101; 710/126; 333/22 R; 333/32; 333/17.3
(58) Field of Search ................................ 326/21, 30, 86, 326/90; 333/22 R, 32, 17.3; 710/101, 126

(56) References Cited

U.S. PATENT DOCUMENTS

| | | | |
|---|---|---|---|
| 5,467,455 A | | 11/1995 | Gay et al. |
| 5,635,852 A | | 6/1997 | Wallace |
| 5,831,467 A | * | 11/1998 | Leung et al. ............... 327/319 |
| 5,926,031 A | | 7/1999 | Wallace et al. |
| 6,026,456 A | * | 2/2000 | Ilkbahar ..................... 710/101 |
| 6,061,754 A | * | 5/2000 | Cepulis et al. .............. 710/126 |
| 6,067,594 A | * | 5/2000 | Perino et al. ............... 710/126 |
| 6,072,342 A | | 6/2000 | Haider et al. |
| 6,100,713 A | | 8/2000 | Kalb et al. |
| 6,160,417 A | * | 12/2000 | Taguchi ....................... 326/30 |

OTHER PUBLICATIONS

Vishwanthaiah et al., "Dynamic Termination Output Driver for a 600 MHz Microprocessor,"ISSCC2000/Session 15 Slide Supplement, 2000.
"Active Switches amd Active Termination for SDRAM–DDR Memory Dimms," 6/1998.

* cited by examiner

Primary Examiner—Michael Tokar
Assistant Examiner—Vibol Tan
(74) Attorney, Agent, or Firm—Dickstein Shapiro Morin & Oshinsky LLP

(57) ABSTRACT

An active termination circuit is incorporated into the devices connected to a multidrop bus. By including the active termination circuit on the devices instead of the bus, termination resistors can be removed from the system PCB, which saves costs and frees up precious space on the PCB. The active termination circuit has a termination enabled state and a termination disabled state. The active termination circuit is selectively placed into the enabled or disabled states in specified devices depending upon, for example, device location or communication traffic on the bus. The multidrop system can also utilize a separate passive termination mechanism in combination with the active termination circuits utilized in the devices.

50 Claims, 11 Drawing Sheets

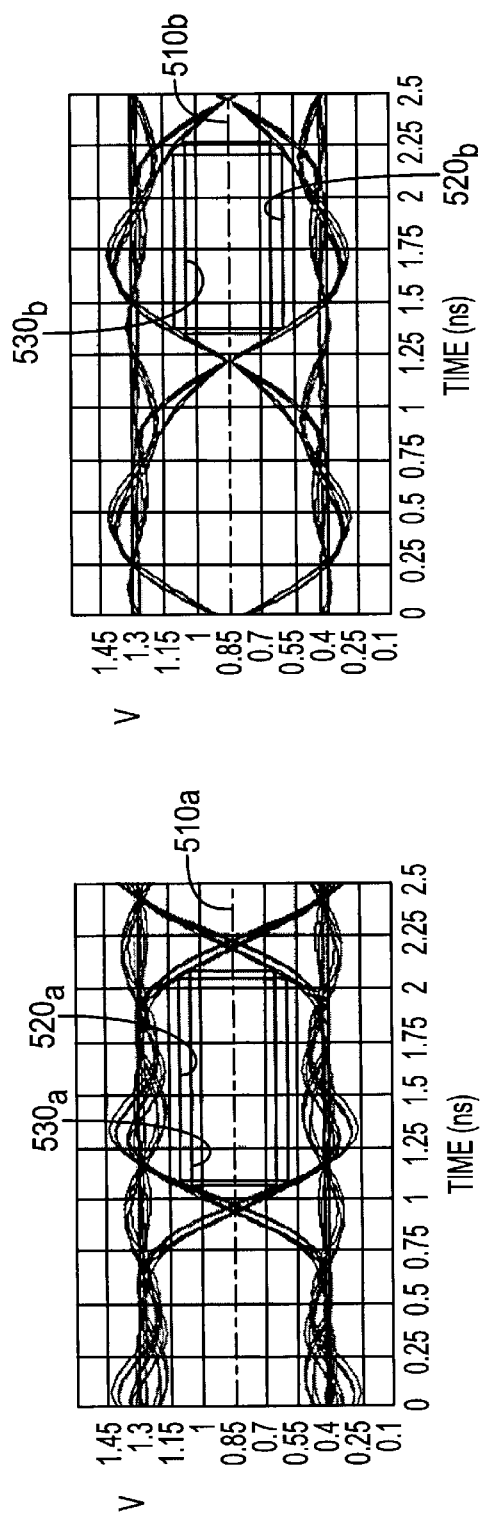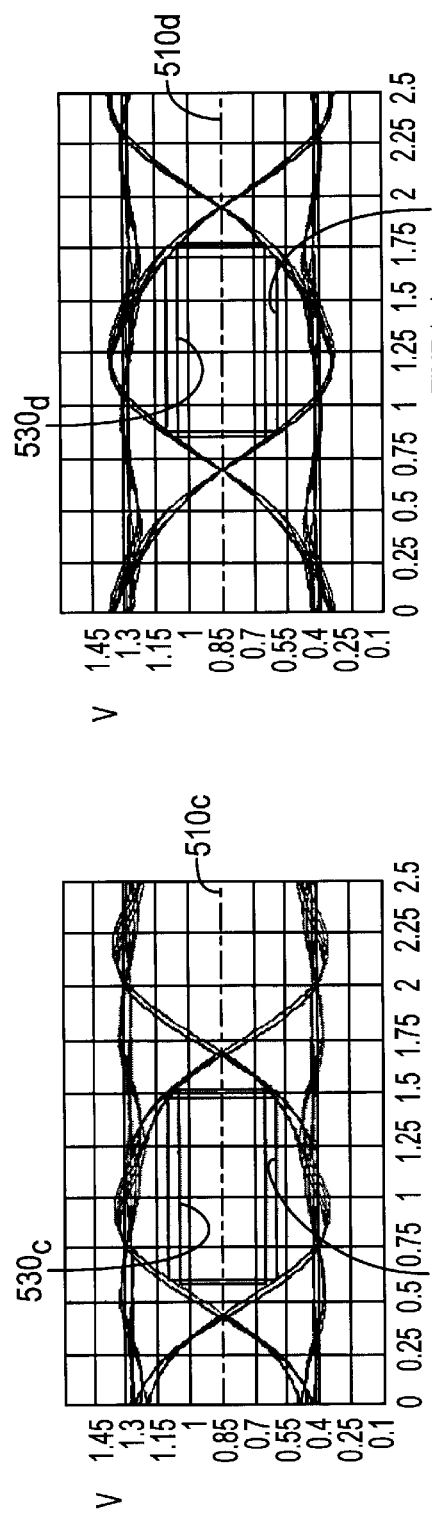

ACTIVE TERMINATION IN A MULTIDROP MEMORY SYSTEM

FIELD OF THE INVENTION

The present invention relates generally to the field of computer bus systems, and more particularly to the active termination of a transmission line in a multidrop memory system.

BACKGROUND OF THE INVENTION

In the design and implementation of electronic systems, such as digital computers and consumer electronic devices, undesired transmission line effects are a major concern. As signals propagate down the system's transmission lines, e.g., traces on a printed circuit board (PCB), unwanted signal reflections may occur on the lines. The reflections are a result of mismatched impedances between the driver impedance, receiver impedances, and interconnecting transmission lines. The reflections and other undesired transmission line effects are often exacerbated as the operating speed of the system increases. If left uncorrected, the reflections may cause the signal's voltage to swing outside of the defined "0" or "1" voltage levels, thereby causing the receiving device to incorrectly interpret the received signal. An incorrect interpretation of the received signal will cause the receiving device to respond incorrectly and possibly generate an erroneous result.

Termination is used in high-speed signaling systems to improve signal integrity and operating bandwidth by minimizing transmission line reflections. Series terminated lines provide improvement by minimizing reflections that would have otherwise occurred at the driving node. Series termination does not increase the power dissipation relative to unterminated transmission lines. In general, parallel termination schemes can provide greater bandwidth than series termination, but power dissipation increases due to the current flowing through the parallel resistor to its reference supply. To supply the termination current, the driver current must be increased. To increase the driver current, the driver sizes must increase, which also means that the overall circuit capacitance will increase. These factors can offset some of the bandwidth improvements that parallel schemes offer.

Another disadvantage of both the series and parallel termination schemes is the increased cost associated with adding the termination resistors to the system. In addition, both termination schemes use an increased area on the PCB to implement the termination resistors. It is desirable to decrease the cost and PCB area attributable to the current termination schemes.

High-speed memory subsystems, such as double data rate (DDR) synchronous dynamic random access memory (SDRAM) systems, often employ series and/or parallel termination resistors to maximize the system operating bandwidth. These systems are typically bussed systems with multiple driving and receiving locations along the bus (the bus is often referred to as a "multidrop bus" and the system is often referred to as a "multidrop system") and are thus different than point-to-point systems (typically having one main driving location and one main receiving location on the bus). From a signal standpoint, the provision of multiple devices on the multidrop bus can be problematic since the devices represent electrical stubs to the bus, which leads to reflections on the bus. These reflections degrade the signal integrity and therefore, limit the maximum bandwidth and timing margin of the multidrop system. Thus, the multidrop bus requires a termination scheme. Unfortunately, the termination schemes in the multidrop systems also suffer from the above-mentioned shortcomings.

Accordingly, there is a desire and need for a termination scheme in a multidrop system that improves signal integrity on the system transmission line, yet does not substantially increase the cost of the system. There is also a desire and need for a termination scheme in a multidrop system that improves signal integrity on the system transmission line, yet does not take up precious space on the system PCB.

SUMMARY OF THE INVENTION

The present invention provides a termination scheme in a multidrop system that improves signal integrity on the system transmission line, yet does not substantially increase the cost of the system.

The present invention also provides a termination scheme in a multidrop system that improves signal integrity on the system transmission line, yet does not take up substantial space on the system PCB.

The above and other features and advantages are achieved by incorporating an active termination circuit in the devices connected to a multidrop bus. By including the active termination circuit on the devices instead of the bus, termination resistors can be removed from the system PCB, which saves costs and frees up precious space on the PCB. The active termination circuit has a termination enabled state and a termination disabled state. The active termination circuit is selectively placed into the enabled or disabled states in specified devices depending upon, for example, device location or communication traffic on the bus. The multidrop system can also utilize a separate passive termination mechanism in combination with the active termination circuits utilized in the devices.

It should be noted that active termination schemes have been employed in receivers of point-to-point systems having only two devices. The present invention, however, employs selectable active termination in a multidrop memory system, where termination is activated on a subset of the devices connected to the multidrop bus. In the present invention, the activation of the termination is based on the device location, and on which devices are communicating. Additionally, the termination of the present invention may or may not be activated on all devices intending to receive data.

BRIEF DESCRIPTION OF THE DRAWINGS

The above and other advantages and features of the invention will be more clearly understood from the following detailed description of the invention, which is provided in connection with the accompanying drawings in which:

FIGS. 7a–10d are signal plots showing aperture widths during write operations performed by the memory controller illustrated in FIG. 4 in accordance with numerous exemplary embodiments of the invention.

DETAILED DESCRIPTION OF THE PREFERRED EMBODIMENTS

Figure 1:
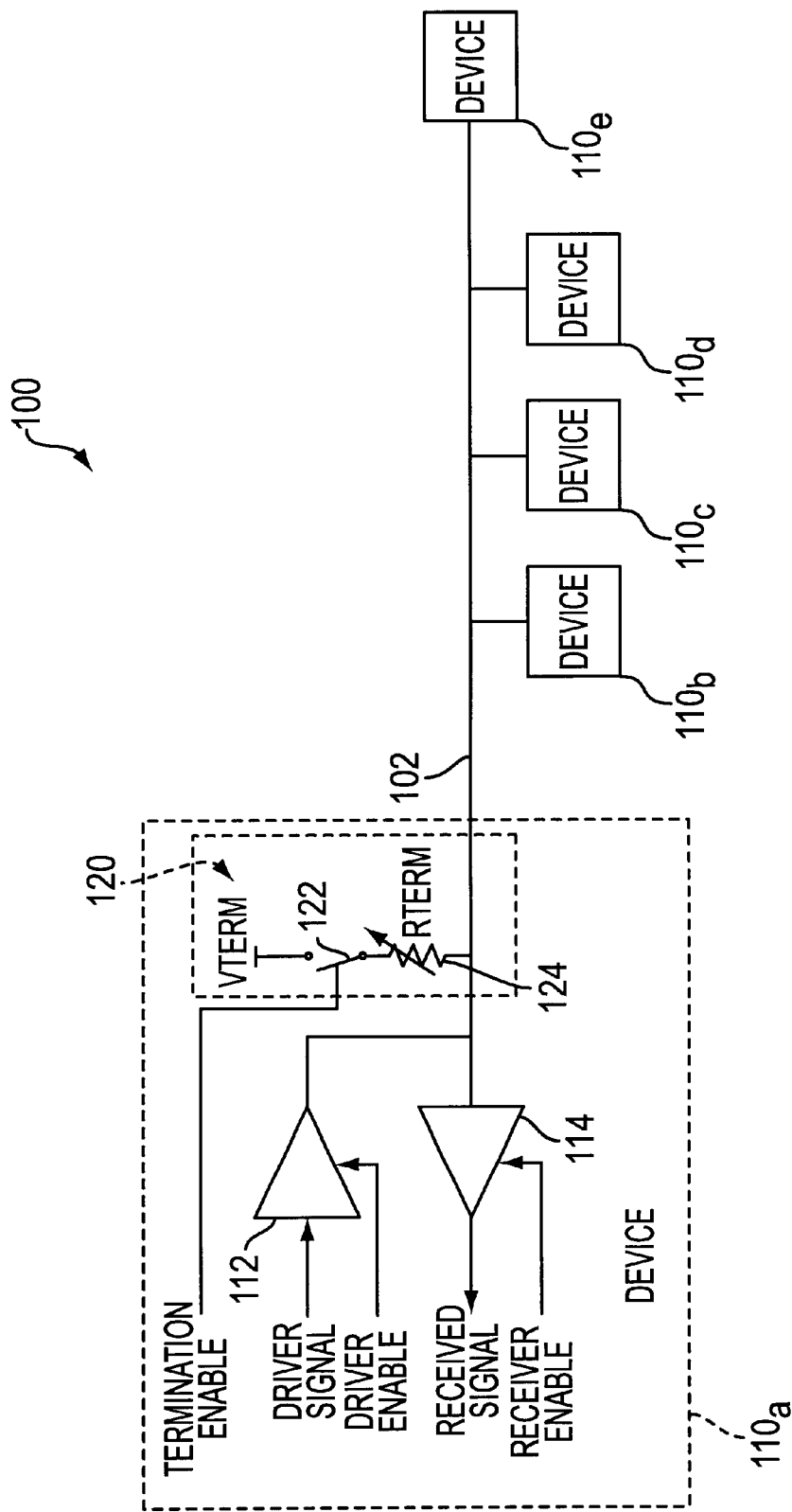
FIG. 1 is a block diagram illustrating an exemplary multidrop system containing devices having active termination circuits in accordance with an exemplary embodiment of the invention.

The present invention will be described as set forth in the embodiments illustrated in FIGS. 1–11. Other embodiments may be utilized and structural or logical changes may be made without departing from the spirit or scope of the present invention. Like items are referred to by like reference numerals.

FIG. 1 is a block diagram illustrating an exemplary multidrop system 100 containing a plurality of devices $110_a$, $110_b$, $110_c$, $110_d$, $110_e$ (collectively referred to herein as "devices 110") having an active termination circuit 120. In one exemplary embodiment, the system 100 is a memory subsystem, such as e.g., a DDR SDRAM subsystem. It should be noted, however, that this is just one example and that the same system 100 is appropriate for any high-speed multidrop system that utilizes a multidrop digital bus requiring termination.

The system 100 contains a multidrop bus 102, which may be an input/output (I/O) bus, a command/address bus, a data bus or any other bus suitable for communication between the devices 110 in a high-speed system. The devices 110 may include a central processing unit (CPU), memory controller, bus controller, memory device or module, I/O device, or any other device used in a high-speed multidrop system. In a preferred embodiment, the system 100 is a memory subsystem with one device (e.g., device $110_a$) being a memory controller and the remaining devices 110 being memory modules in communication with the controller over the bus 102. It should be apparent, however, that the invention is not limited to any particular number of, or type of, devices 110 in the system 100.

Each device 110 may include a transmitting driver 112 for driving a signal DRIVER SIGNAL on to the bus 102. Typically, the transmitting driver 112 is controlled by a driver enable signal DRIVER ENABLE, which enables the transmitting driver 112 to transmit the driving signal DRIVER SIGNAL on to the bus 102. It should be noted that if a particular device does not transmit signals on to the bus 102, then that device may not have a transmitting driver 112.

Each device 110 may also include a receiving driver 114 for receiving a signal RECEIVED SIGNAL from the bus 102. Typically, the receiving driver 114 is controlled by a receiver enable signal RECEIVER ENABLE, which enables the receiving driver 114 to receive signals RECEIVED SIGNAL from the bus 102. It should be noted that if a particular device does not receive signals from the bus 102, then that device may not have a receiving driver 114.

Each device should also include an active termination circuit 120. In a first exemplary embodiment, the termination circuit 120 includes a switch 122 connected between a "trimmable" termination resistor 124, having a trimmable termination resistance RTERM, and a reference voltage VTERM. It is desirable that the termination circuit 120 comprises a simple termination network that can be switched on and off very quickly. Moreover, it is desirable that the termination circuit 120 does not significantly increase the input capacitance of the device 110. The simple circuitry and solid-state switch contained in the termination circuitry 120 of the present embodiment (and subsequent embodiments) meets both of these goals.

The termination resistance RTERM is modified during a calibration process to provide substantially optimal termination of the bus 102. The calibration process will be discussed below in more detail. The termination resistor 124 is also connected to the bus 102. The switch 122 is controlled by a termination enable signal TERMINATION ENABLE. The switch 122 can be a solid-state switch, transistor or any switching element that can be activated by a control signal, such as the termination enable signal TERMINATION ENABLE.

The active termination circuit 120 can be programmed into one of two states. The first state is a termination enabled state and the second state is a termination disabled state. The active termination circuit 120 can be programmed into the termination enabled state by driving the termination enable signal TERMINATION ENABLE to a level that will close the switch 122 (or keep the switch in a closed position). Once in the termination enabled state (i.e., switch 122 is in the closed position), the active termination circuit 120 provides termination to the bus 102 based on the termination resistance RTERM and the reference voltage VTERM. The selection of the termination resistance RTERM and the reference voltage VTERM will be described in more detail below.

The active termination circuit 120 can be programmed into the termination disabled state by driving the termination enable signal TERMINATION ENABLE to a level that will open the switch 122 (or keep the switch 122 in a open position). Once in the termination disabled state (i.e., switch 122 is in the open position), the active termination circuit 120 does not provide termination to the bus 102. Accordingly, the active termination circuit 120 can be selectively programmed between a termination enabled state, where the circuit 120 provides termination to the bus 102, and a termination disabled state, where the circuit 120 does not provide termination to the bus 102.

Thus, the invention places the termination circuitry (e.g., circuit 120) on the devices 110 of the system 100 as opposed to the system PCB. Thus, termination resistors may be removed from the system PCB. This saves cost, and may often be the only practical way to implement termination due to the congestion that the termination resistors would create.

The following propositions are use full in understanding the operation of the present invention in certain circumstances. Although there are multiple devices 110 on the multidrop bus 102, the communication on the bus 102 often takes place between two devices 110 at a time (e.g., between a memory controller and one memory device in a memory subsystem). In this scenario, the signal integrity need only be acceptable at the receiving device 110. Thus, it may be advantageous for the receiving device to enable its termination. In other situations, however, such as when the bus 102 is a control bus, it may be necessary for multiple devices to enable their terminations. Deciding when a device's termination should be enabled can be determined by performing electrical analysis of the system wiring topology.

In operation, termination can be enabled in some devices 110 and disabled in other devices 110 depending upon the communication traffic on the bus 102. This can best be illustrated with the following example. Let device $110_a$ be a memory controller and devices $110_b$–$110_e$ be memory modules. In this scenario, the memory controller (e.g., device $110_a$) may activate its termination (via active termination circuit 120) when it expects to receive data over the bus 102 from one of the memory modules (e.g., devices $110_b$–$110_e$). In this example, the bus 102 would be terminated at the end of the "transmission line" and the signal quality would be good at the location near the termination (where it needs to be—i.e., next to the receiving device $110_a$) When the controller (e.g., device $110_a$) wishes to transmit information on to the bus 102, it can disable its bus termination (via active termination circuit 120) since the bus 102 will be terminated by the receiving device or devices (e.g., devices $110_b$–$110_e$). In doing so, the controller can reduce power dissipation and also use a smaller sized driver 112.

In another embodiment, termination can be selectively enabled/disabled in the devices 110 depending upon their location in the system 100. For example, the end devices $110_a$, $110_e$ in a control system may enable termination while the inside devices $110_b$–$10_d$ may disable termination. In this manner, power dissipation is reduced and the bus 102 can be terminated at both ends for substantially optimal signal integrity. Essentially, the invention makes it is possible to selectively enable/disable any device's 110 termination on the bus 102 (via the active termination circuit 120) to substantially optimize the signal integrity for any particular data transfer (or other signal transfer) being performed in the system 100. It should be noted that only one resistor 124 is illustrated, but that any number of resistive elements, whether combined in parallel, series or both, can be used to make up the termination resistor 124 and its resistance RTERM.

Figure 2:
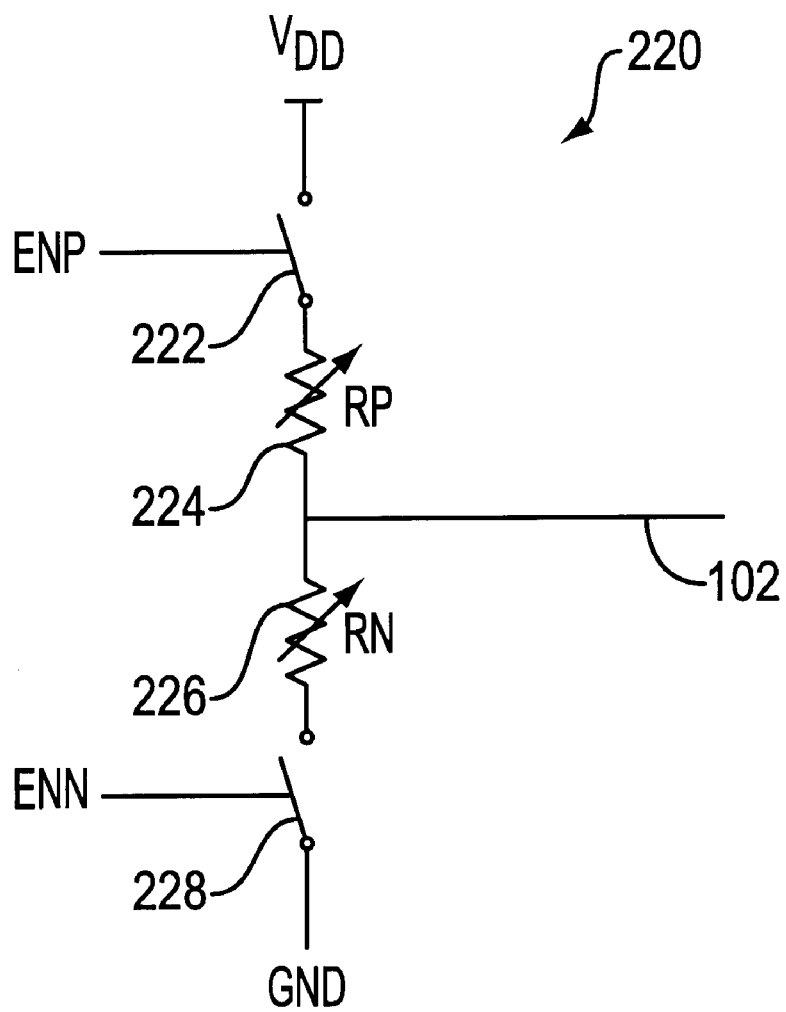
FIG. 2 is a circuit diagram illustrating a second exemplary active termination circuit constructed in accordance with another exemplary embodiment of the invention.

FIG. 2 is a circuit diagram illustrating another exemplary active termination circuit 220 constructed in accordance with a second embodiment of the invention. The circuit 220 can be used, for example, in any/all of the devices 110 of system 100 (FIG. 1). The active termination circuit 220 of this embodiment is essentially a voltage divider circuit having first and second switches 222, 228 and first and second trimmable termination resistors 224, 226.

The first termination resistor 224 has a first trimmable termination resistance RP while the second termination resistor 226 has a second trimmable termination resistance RN. The first and second termination resistors 224, 226 are connected in series between a first reference voltage VDD and a second reference voltage GND, preferably a ground potential. When switch 222 and switch 228 are closed, the first termination resistor 224 and the second termination resistor 226 act as a voltage divider. The voltage from this circuit becomes the desired bus terminating voltage Vterm. The impedance of this circuit is the parallel combination of resistor 224 and resistor 226. This impedance becomes the desired terminating impedance. Essentially, circuit 220 is the Thevenin equivalent of circuit 120 in FIG. 1.

The first and second termination resistors 224, 226 are also connected to the bus 102. The first switch 222 is controlled by a first termination enable signal ENP while the second switch 228 is controlled by a second termination enable signal ENN. The switches 222, 228 can be solid-state switches, transistors or any switching elements that can be activated by a control signal, such as the first and second termination enable signals ENP, ENN. In one desired embodiment, the first and second termination enable signals ENP, ENN would be generated at the same time such that the two switches 222, 228 open or close simultaneously with respect to each other. The two termination resistances RP, RN would be set during the calibration process to provide substantially optimal termination of the bus 102 when both switches 222, 228 are closed (described below).

For calibration purposes, it may be desirable for the first and second termination enable signals ENP, ENN to be generated at the same time, but with different values such that only one of the two switches 222, 228 opens while the other switch 222, 228 closes. This would allow the calibrator the opportunity to determine and set the value of each termination resistor 224, 226 separately.

Similar to the active termination circuit 120 illustrated in FIG. 1, the active termination circuit 220 of the present embodiment can be programmed into one of two states. The first state is a termination enabled state and the second state is a termination disabled state. The active termination circuit 220 can be programmed into the termination enabled state by driving the two termination enable signals ENP, ENN to a level that will close both switches 222, 228 (or keep the switches 222, 228 in a closed position). Once in the termination enabled state (i.e., switches 222, 228 are in the closed position), the active termination circuit 220 provides termination to the bus 102 based on the two termination resistances RP, RN and the reference voltage VTERM.

The active termination circuit 220 can be programmed into the termination disabled state by driving the two termination enable signals ENP, ENN to a level that will open both switches 222, 228 (or keep the switches 222, 228 in an open position). Once in the termination disabled state (i.e., switches 222, 228 are in the open position), the active termination circuit 220 does not provide termination to the bus 102. Accordingly, the active termination circuit 220 can be selectively programmed between a termination enabled state, where the circuit 220 provides termination to the bus 102, and a termination disabled state, where the circuit 220 does not provide termination to the bus 102.

Figure 3:
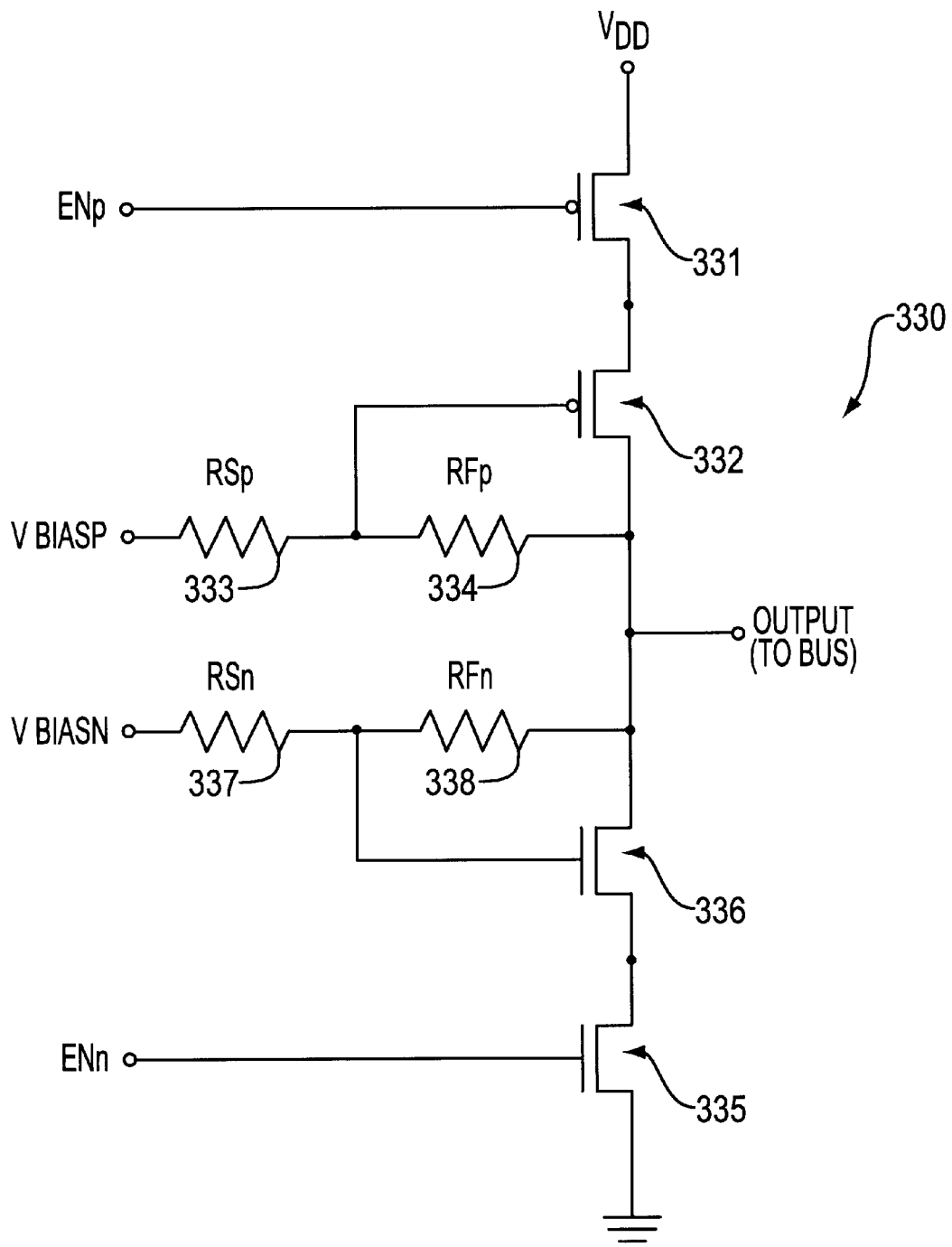
FIG. 3 is a circuit diagram illustrating another exemplary active termination circuit constructed in accordance with another exemplary embodiment of the invention.

FIG. 3 is a circuit diagram illustrating another exemplary active termination circuit 330 constructed in accordance with another embodiment of the invention The circuit 330 can be used, for example, in any/all of the devices 110 of system 100 (FIG. 1). The active termination circuit 330 is essentially a voltage divider circuit between transistors 332 and 336 which are biased to act as linearized resistors whose value is set to obtain the proper impedance and voltage at the OUTPUT. Circuit 330 uses transistors 331 and 335 as switches that enable or disable the active termination. The two transistors 331, 322 are preferably p-channel MOSFETs (metal-oxide-semiconductor field-effect-transistors). The two transistors 336, 335 are preferably n-channel MOSFETs (metal-oxide-semiconductor field-effect-transistors). The circuit also includes source resistors 333 and 337 and feedback resistors 334 and 338.

The source resistors 333 (RSp) and 337 (RSn) and the feedback resistors 334 (RFp) and 338 (RFn) have relatively high resistances compared to the impedance of the transmission line (i.e., bus 102). The resistors 333, 334 are connected to each other in series. The resistors 337, 338 are also connected to each other in series. A first reference voltage VBIASP is connected to an end of the source resistor 333. A second reference voltage VBIASN is connected to an end of the source resistor 337. The gate terminal of the termination transistor 332 is coupled between the series connection of the two resistors 333, 334. A source terminal of the termination transistor 332 is connected to a drain terminal of the first transistor 331. A drain terminal of the termination transistor 332 is connected to an output terminal OUTPUT and the feedback resistor 334. The gate terminal of the termination transistor 336 is coupled between the series connection of the two resistors 337, 338. A source terminal of the termination transistor 336 is connected to a drain terminal of transistor 335. A drain terminal of the termination transistor 336 is connected to an output terminal OUTPUT and the feedback resistor 338.

The output terminal OUTPUT is also connected to the multidrop bus. The transistors 331,335, which serve as switches in the circuit 330, are controlled by a termination enable signals ENp and ENn. It should be apparent, that the transistors 331, 335 could be replaced by any conventional switching element that may be controlled by the termination enable signals ENp, ENn.

Similar to the active termination circuit 220 illustrated in FIG. 2, the active termination circuit 330 of the present embodiment can be programmed into one of two states. The first state is a termination enabled state and the second state is a termination disabled state. The active termination circuit 330 can be programmed into the termination enabled state by driving the termination enable signals ENp, ENn to levels that will activate the transistors 331,335 (i.e., close the "switches"). Once in the termination enabled state (i.e., the transistors 331,335 are activated), the active termination circuit 330 provides termination to the bus 102 based on the impedance of the parallel combination of termination transistors 332,336 as modified by the resistances RSp, RFp, RSn, RFn of the source and feedback resistors 333, 334, 337, 338 and the reference voltages VBIASP and VBIASN. Essentially, the resistances RSp, RFp, RSn, RFn lower and linearize the impedance of the termination transistors 332, 336 such that it provides substantially optimized termination to the multidrop bus (relative to the device the circuit 330 is in).

The active termination circuit 330 can be programmed into the termination disabled state by driving the termination enable signals ENp, ENn to levels that will deactivate the transistors 332,336 (i.e., open the "switches"). Once in the termination disabled state (i.e., the transistors 332,336 is deactivated), the active termination circuit 330 does not provide termination to the multidrop bus. Accordingly, the active termination circuit 330 can be selectively programmed between a termination enabled state, where the circuit 330 provides termination to the bus, and a termination disabled state, where the circuit 330 does not provide termination to the bus. Similar to the first embodiment circuit 120, the embodiments illustrated in FIGS. 2, and 3 could use any combination of resistive elements to achieve the desired termination resistance needed to terminate the bus 102.

The possible calibration techniques that can be used in the present invention are now described with reference to FIGS. 1–3. As noted above, the values of the termination resistors, transistors reference voltages of each active termination circuit 120, 220, 330 are selected such that they provide substantially optimal termination of the bus 102 for that device 110. This can be done during a calibration procedure performed after the system 100 has been configured and prior to its first use. This type of calibration is referred to herein as "static calibration." Moreover, it is possible to adjust the values of the termination resistors and the reference voltages VTERM of an active termination circuit 120, 220, 330 once the system 100 is operating. This type of calibration is referred to herein as "dynamic calibration."

A first calibration process can be performed such that the termination resistance (whether it be the termination resistors alone or in combination with the termination transistor) is calibrated for process, voltage, or temperature (PVT) variations. Another calibration process is performed by increasing/decreasing the drive strengths of the transistors used in the active termination circuit 330. For example, if it is not possible or cost effective to manufacture resistors to the required tolerance, they may be trimmed after manufacturing. If additional resistors have been incorporated into the design that can be switched in or out of the active termination circuit 120, 220, 330, they may be combined in parallel and/or series to yield the desired termination resistance value within the required tolerance. Series elements may be switched using shunt transistors, and parallel elements may be switched using series transistors.

It is also possible to use the resistance of the transistor switches as part or all of the total resistance of an active termination circuit 330. For example, a resistor might have several parallel transistors in series with it. The total resistance will be the value of the resistor plus the parallel resistance of the transistors that are turned on. In some cases, the "ON" resistance of the transistor may be adequate to allow elimination of the passive resistors. If the value of a resistor needs to change as a result of temperature or supply voltage changes, this can be done in a similar fashion by performing a calibration cycle while the part is operating (i.e., dynamic calibration).

Another calibration process may be performed for active termination circuit 220 by first setting the resistance of the pull-up (or pull-down) resistor (i.e., the first or second termination resistor 224, 226) against a known passive resistor, and then balancing the pull-down (or pull-up) resistor against the opposite resistor (i.e., the second or first termination resistor 226, 224). A possible calibration method that can be used during the static calibration process or during dynamic calibration entails having a known passive resistor connected between the active termination and a known voltage which falls between a ground potential (or other voltage) and the Thevenin equivalent voltage of the bus voltage. The pull-up (pull-down) resistor is then switched off, and combinations of pull-down (pull-up) resistance are switched on until the desired voltage division is achieved. The pull-up (pull-down) resistor is finally adjusted until a predetermined voltage is obtained.

In addition, if the termination resistor is known to a reasonable accuracy (approximately 5%), the dynamic pull-up resistor can be activated. For the desired resistance, a known voltage divider ratio and a known voltage level will exist. The resistance can be adjusted to achieve this voltage on the output. Next, the dynamic pull-up and pull-down resistances can be activated and a new ideal voltage can be calibrated at the output by adjusting only the dynamic pull-up and pull-down resistance. In this manner, the dynamic pull-up and pull-down resistance can be calibrated to absolute accuracies approaching that of an external resistor.

It is also possible to calibrate the active termination circuits 120, 220, 330 during the manufacturing process if desired. Possible adjustment techniques during the manufacturing process include programming fuses or antifuses to turn on or off the various transistors or fingers of transistors, trimming the resistors with a laser, etc.

Figure 11:
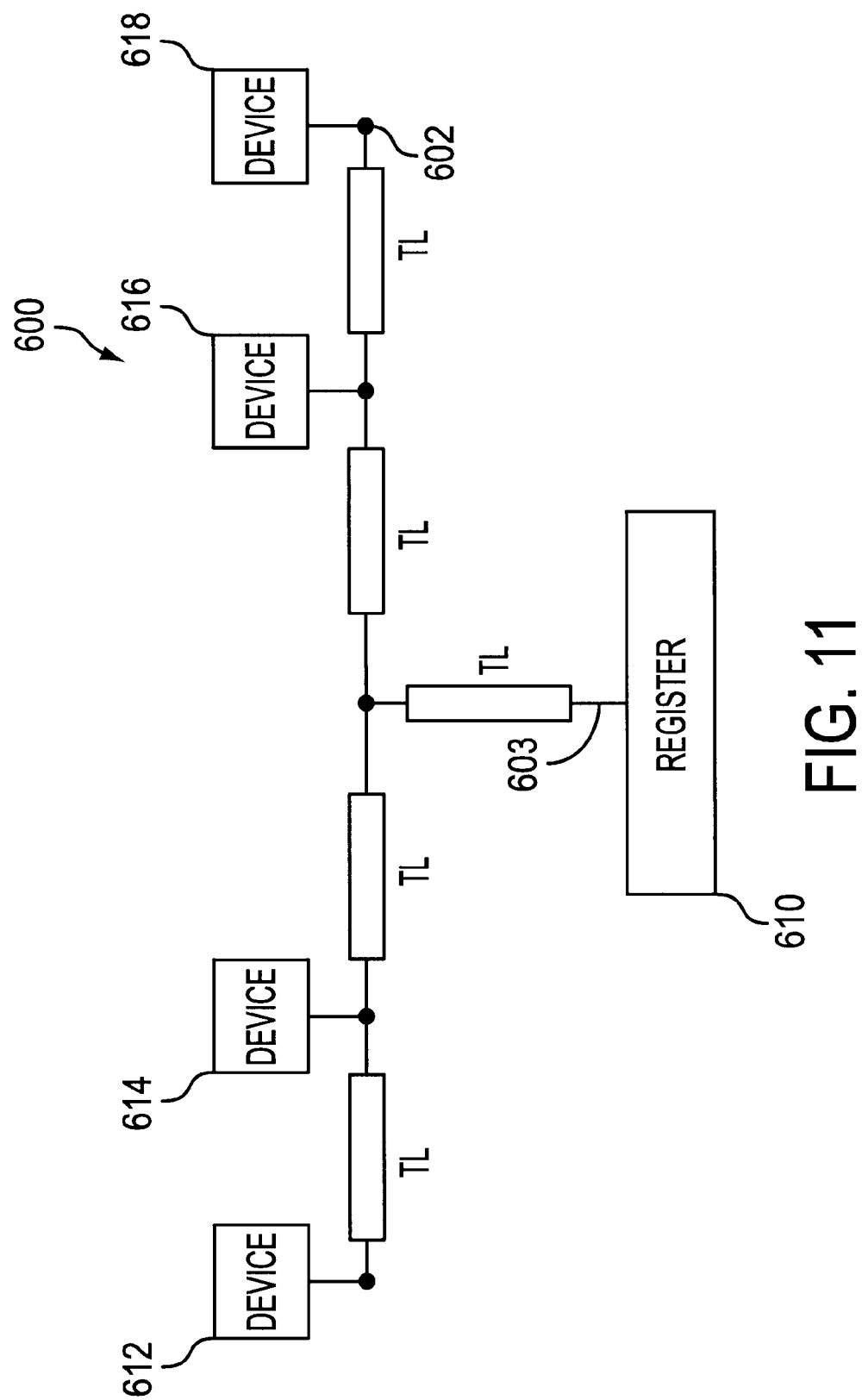
FIG. 11 is a block diagram illustrating a memory module having a multidrop command/address bus containing devices with active termination circuits.

FIG. 11 illustrates a situation in which a multidrop command/address bus 602 on a memory module 600 can implement active termination in accordance with the present invention. The module 600 contains a plurality of memory devices 612, 614, 616, 618 coupled to various points of the command/address bus 602. A command/address register 610 is also connected to the bus 602 by another transmission line 603. In this configuration, the two devices 612, 618 at the end of the bus 602 will have active termination enabled, while the two middle devices 614, 616 will have termination disabled.

Referring now to FIG. 1, it should be appreciated that the values of the termination resistors 124 (i.e., termination resistance RTERM) and the reference voltages VTERM of each active termination circuit 120 can be different for each device 110 in the system 100. For example, it is possible to set the termination resistance RTERM of device $110_a$ to 50 Ω, device $110_b$ to 40 Ω, device $110_c$ to 45 Ω, device $110_d$ to 30 Ω, and device $110_e$ to 45 Ω if needed to provide substantially optimal termination of the bus 102 when the devices 110 are receiving information. It is also possible to set the termination resistance RTERM of each device 110 to the same value, if this provides sufficient termination. Thus, after undergoing the calibration process, the system 100 will be configured such that each active termination circuit 120 provides substantially optimal termination to the bus 102.

The values of the termination resistors 124 (i.e., termination resistance RTERM) and the reference voltages VTERM of each termination circuit 120 can also be chosen such that the reference level between a logic high value and a logic low value changes depending upon which device is receiving the data (or other signal). This allows different quiescent operating points for each device's receiving circuitry. For example, a passive termination of 50 Ω can be connected to VTERM, where VTERM=0.5 *VDD. The active pull-up resistance can be equal to 150 Ω, and the active pull-down resistance can be 75 Ω. This combination will provide a 50 Ω Thevenin resistance for terminating the bus when activated. However, this activation would shift the midpoint voltage of the bus to a voltage lower than 0.5 *VDD. In addition, this may be helpful when different device technologies are used on the same bus 102, such as e.g., a CPU and memory devices. The reference levels can be set by the same calibration techniques described above.

Figure 4:
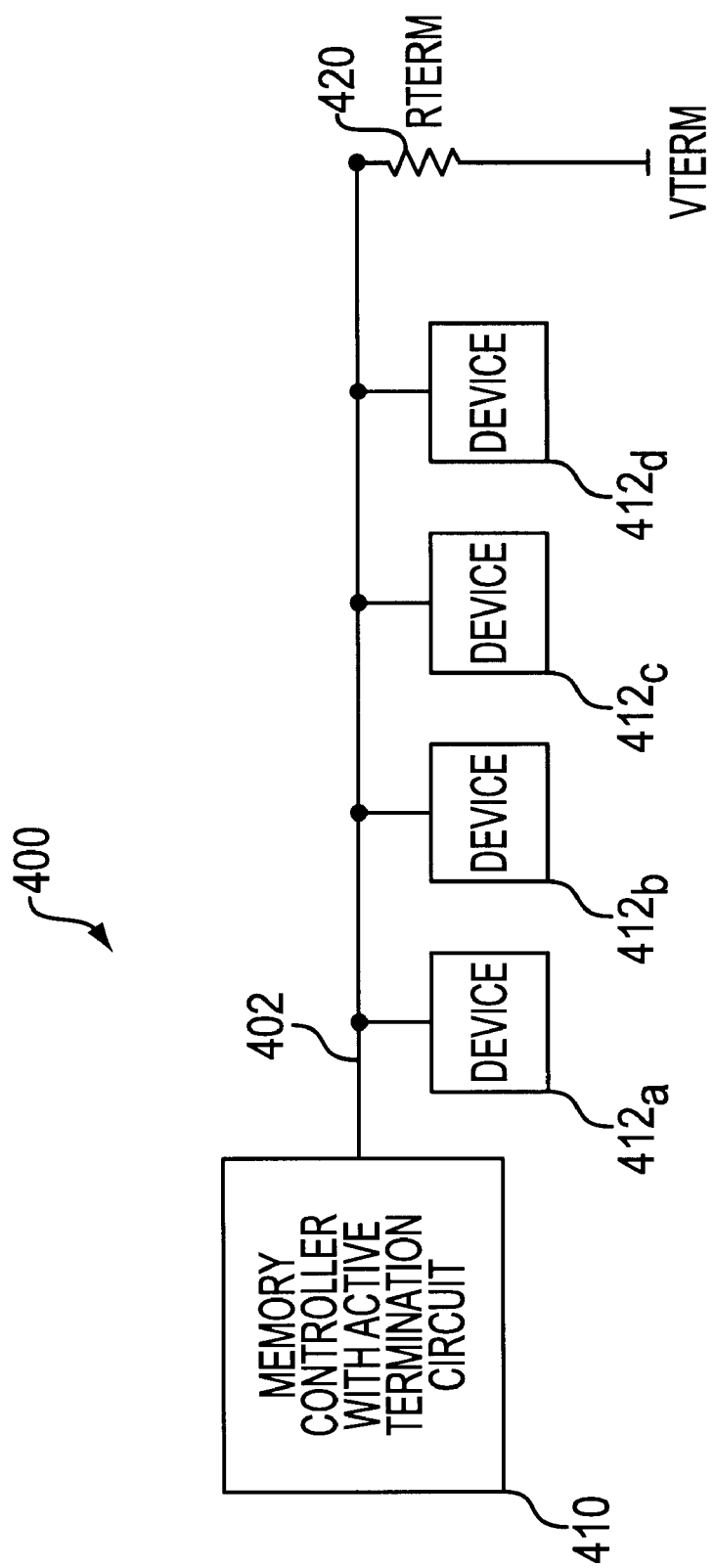
FIG. 4 is a block diagram illustrating an exemplary multidrop memory system containing both active termination and passive termination circuits constructed in accordance with another exemplary embodiment of the invention.

FIG. 4 is a block diagram illustrating an exemplary multidrop memory system 400 containing both active termination and passive termination techniques. In this embodiment, the memory system 400 utilizes both active and passive termination to substantially optimize the termination of the multidrop bus 402. The system 400 contains a memory controller 410 connected to a first end of the multidrop bus 402 and a plurality of memory devices or modules $412_a$, $412_b$, $412_c$, $412_d$ (collectively referred to herein as "devices 412") also connected to the bus 402. In this example embodiment, only the memory controller 410 has an active termination circuit constructed in accordance with any embodiment of the invention (e.g., circuit 120 of FIG. 1, circuit 220 of FIG. 2, or circuit 330 of FIG. 3). Moreover, the system 400 includes a passive termination element 420 having a termination resistance RTERM positioned at the second end of the bus 402 and connected to a reference voltage VTERM. The passive termination element 420 may be located on the system 400 PCB (e.g., motherboard) or it may be located on a device connected to the second end of the bus 402.

In this embodiment, the system 400 is a memory subsystem, such as e.g., a DDR SDRAM subsystem. It should be noted, however, that this is just one example and that the same system 400 is appropriate for any high-speed multidrop memory system. The multidrop bus 402 in this example is an I/O bus and each device $412_a$, $412_b$, $412_c$, $412_d$ is connected to the bus 402 via a respective connector slot (not shown).

In operation, the memory controller 410 will enable termination (via its active termination circuit) when it is about to receive information from one of the devices 410. Once termination is enabled, the bus 402 will be substantially optimally terminated and the memory controller 410 can receive information substantially free from signal reflections. When the memory controller 410 is about to transmit information on to the bus 402, it will disable termination (via its active termination circuit). This can occur even though the other devices 412 are not terminating the bus 402 because the bus 402 is already properly terminated by the passive termination element 420.

Figure 5B:
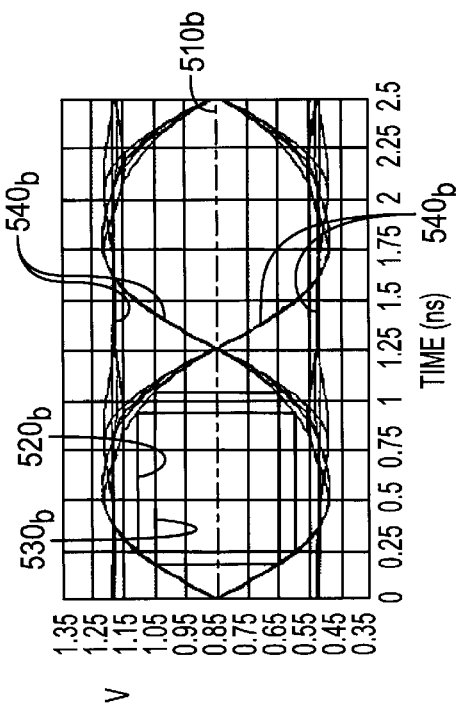
FIGS. 5a–5d are signal plots showing aperture widths during read operations performed by the memory controller illustrated in FIG. 4 in accordance with one exemplary embodiment of the invention.
Figure 5D:
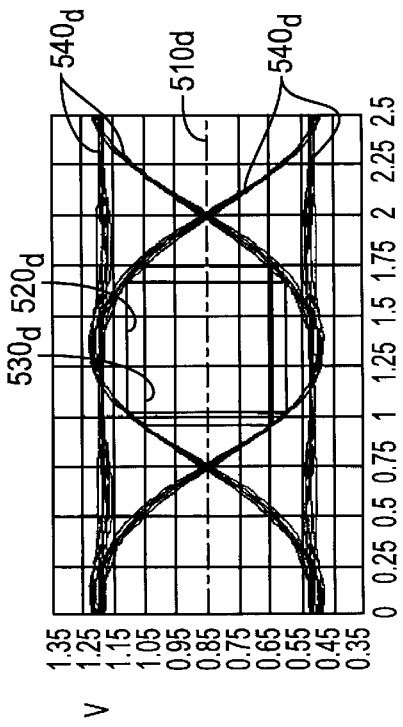
Figure 5A:
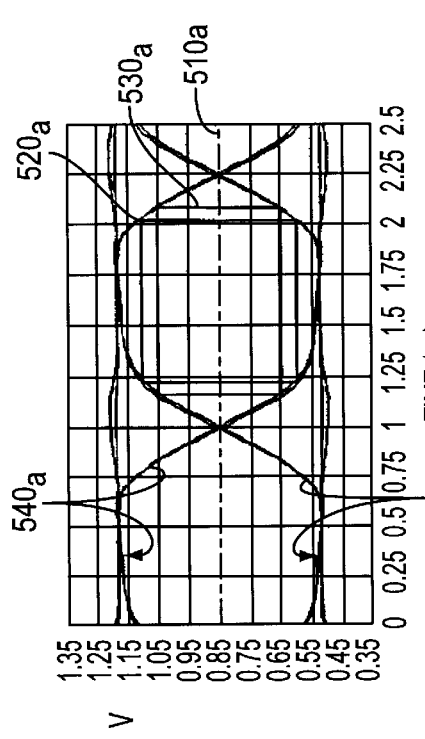
Figure 5C:
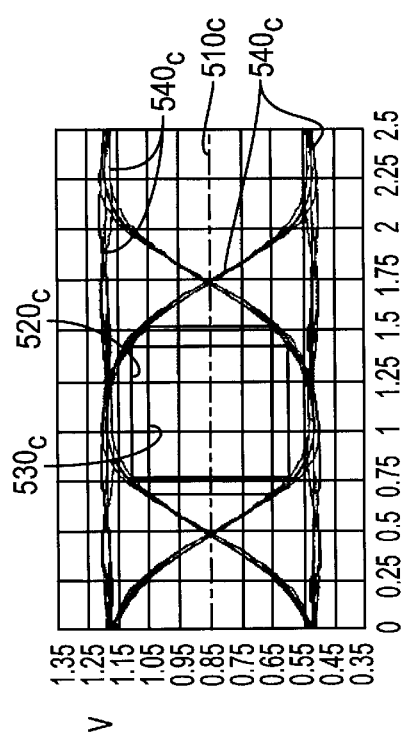

The inventors have compiled the following data to illustrate how the invention provides substantially optimized signal integrity within the system 400. FIGS. 5a–5d are signal plots showing aperture widths during read operations performed by the memory controller 410 in a first example of the system 400. In this example, the controller 410 performed read operations at a speed of 800 megabits per second (Mbps) and enabled termination of the bus 402 prior to the read operations. The termination resistance RTERM of the controller's active termination circuit was 50 Ω and the passive termination element 420 was set to 50 Ω. The devices 412 were not providing termination to the bus 402. The results of the read operations from device $412_a$ are illustrated in FIG. 5a, device $412_b$ are illustrated in FIG. 5b, device $412_c$ are illustrated in FIG. 5c and device $412_d$ are illustrated in FIG. 5d.

Each signal plot shows a reference voltage 510a, 510b, 510c, 510d (referred to herein as the "reference voltage 510"), a first aperture box $520_a$, $520_b$, $520_c$, $520_d$ (collectively referred to herein as the "first aperture boxes 520") for a first overdrive voltage, and a second aperture box $530_a$) $530_b$, $530_c$, $530_d$ (collectively referred to herein as the "second aperture boxes 530") for a second overdrive voltage and the resultant signals $540_a$, $540_b$, $540_c$, $540_d$ (collectively referred to herein as the "resultant signals 540") as seen by the controller 410. The reference voltage 510 is the baseline voltage of the memory bus 400.

Signals are detected on the memory bus 400 by the memory controller 410 when the voltage level of the signal differs by a minimum threshold, or overdrive voltage threshold, from the reference voltage 510. For example, a logical low, sometimes called voltage output low or $V_{ol}$, is detected on the memory bus 400 when the signal is at a voltage below the difference between the reference voltage 510 and the overdrive threshold voltage, while a logical high, sometimes called voltage output high or $V_{oh}$, is detected when the signal is at a voltage above the sum of the reference voltage 510 and the overdrive voltage. Two separate overdrive voltage thresholds are shown on the signal plots because differing memory systems may require different overdrive thresholds.

For example, the use of the larger second overdrive parameter may result in more accurate signal detection in a noisy environment. The aperture boxes 520, 530 illustrate the period of time when the plotted signals 540 differed by at least a first or second overdrive voltage threshold, respectively, to be detectable as either voltage output high or voltage output low. The plotted signals 540 are the signals that are seen by the memory controller 410 when the memory devices 412 drive signals onto the memory bus 402 (i.e., for the read operations illustrated in FIGS. 5a–5d). In each case, the signals driven onto the memory bus 402 are a plurality of pseudo-random pulses.

The system 400 in the current example exhibited the following characteristics. When using the first overdrive threshold of 0.2 volts for read operations, the aperture times were 0.92 nanoseconds (ns), 0.85 ns, 0.83 ns, and 0.79 ns respectively from the four devices 412. When using the second (larger) overdrive voltage threshold of 0.25 volts for read operations, the aperture times of 0.79 ns, 0.69 ns, 0.65 ns, and 0.65 ns respectively from the four devices 412. These values indicate a substantially good signal integrity for the system 400 in this example.

Figure 6B:
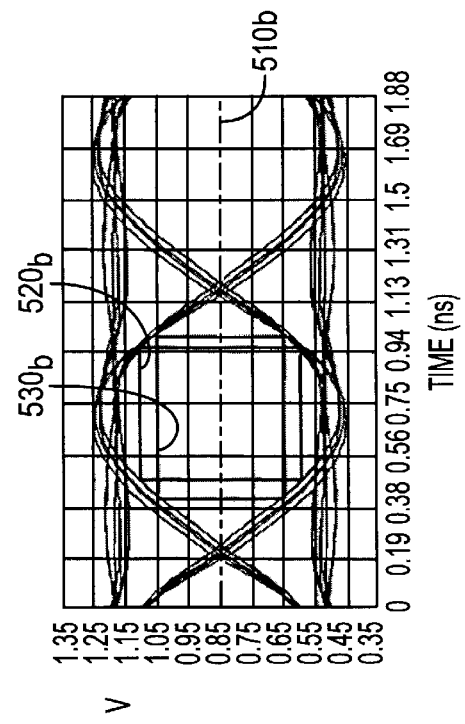
FIGS. 6a–6d are signal plots showing aperture widths during read operations performed by the memory controller illustrated in FIG. 4 in accordance with another exemplary embodiment of the invention.
Figure 6D:
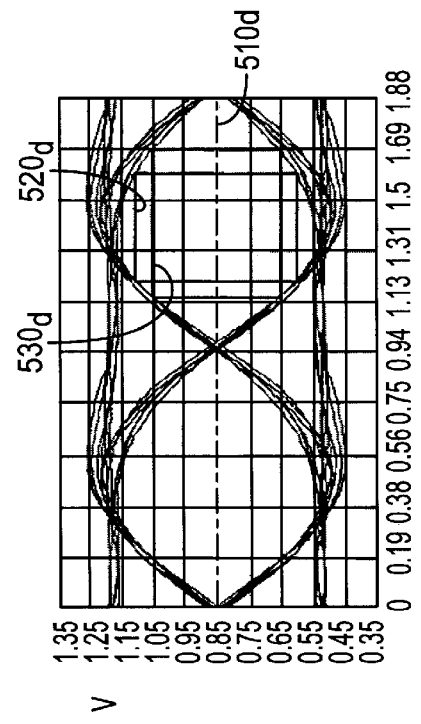
Figure 6A:
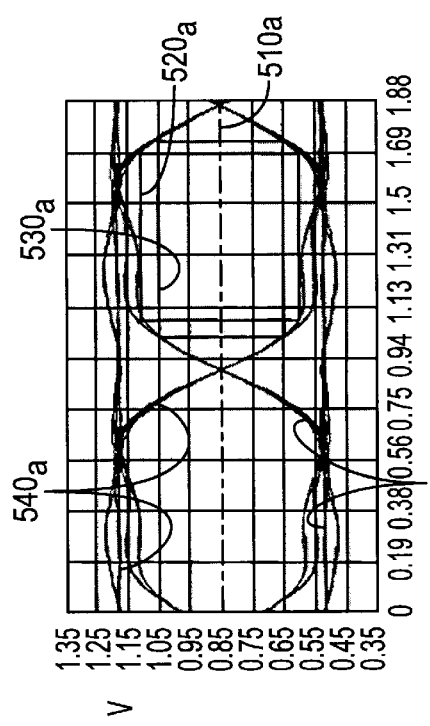
Figure 6C:
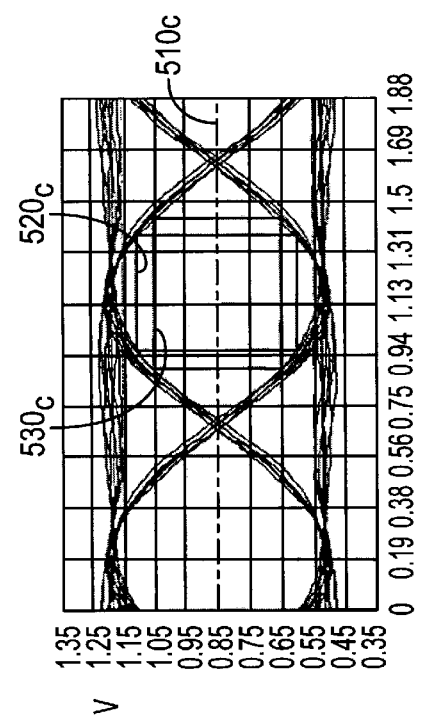

FIGS. 6a–6d are signal plots showing aperture widths during read operations performed by the memory controller 410 in a second example of the system 400 illustrated in FIG. 4. In this second example, the controller 410 performed read operations at a speed of 1064 Mbps and enabled termination of the bus 402 (via the controller's active termination circuit) using a termination resistance RTERM of 50 Ω. The passive termination element 420 was also set to 50 Ω. The devices 412 were not providing termination to the bus 402. The results of the read operations from device $412_a$ are illustrated in FIG. 6a, device $412_b$ are illustrated in FIG. 6b, device $412_c$ are illustrated in FIG. 6c and device $412_d$ are illustrated in FIG. 6d.

The system 400 in this second example exhibited the following characteristics. When using the first overdrive threshold of 0.2 volts for read operations, the aperture times were 0.71 ns, 0.58 ns, 0.54 ns, and 0.54 ns respectively from the four devices 412. When using the second (larger) overdrive voltage threshold of 0.25 volts for read operations, the aperture times of 0.60 ns, 0.48 ns, 0.42 ns, and 0.40 ns respectively from the four devices 412. These values indicate a substantially good signal integrity for the system 400 in the second example.

Figure 8A:
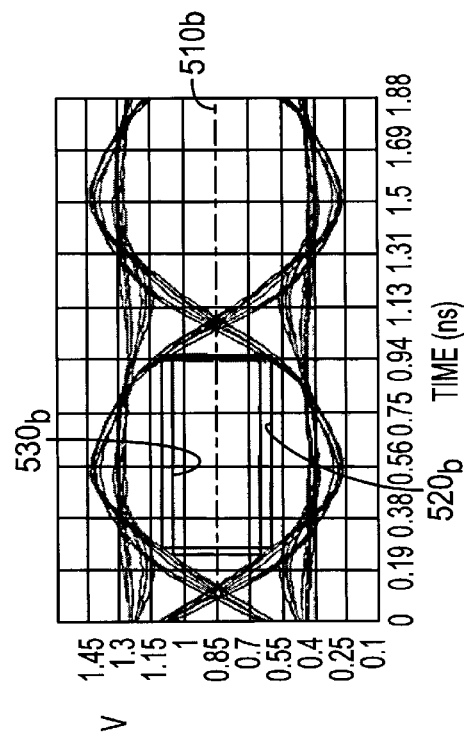
Figure 8B:
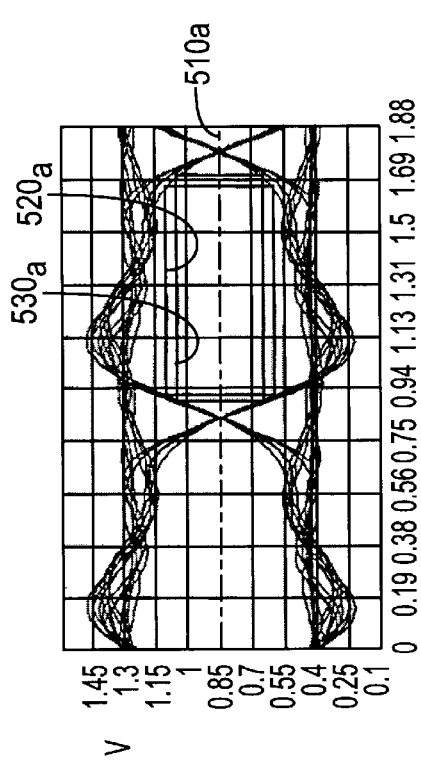
Figure 8C:
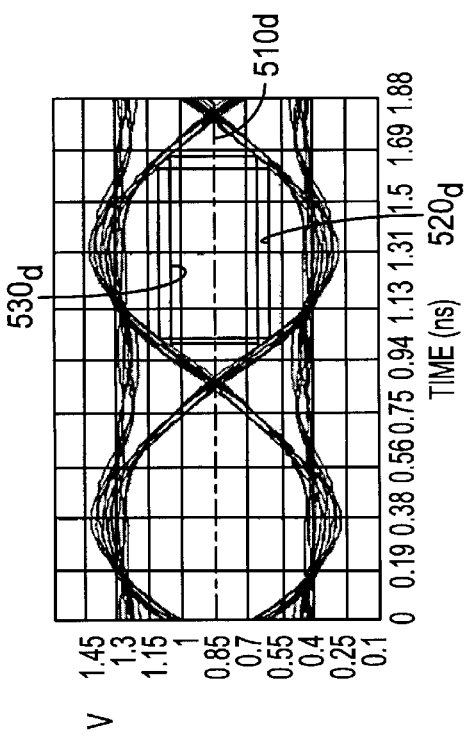
Figure 8D:
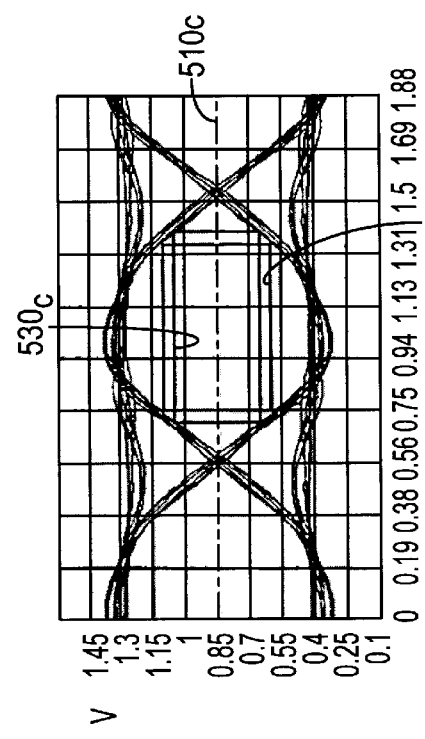

FIGS. 7a–7d and 8a–8d are signal plots respectively showing aperture widths during write operations performed by the memory controller 410 in the first and second example described above. Unlike the read operations described above, however, prior to performing the write operations, the controller 410 disabled its active termination. Thus, during the write operations, only the passive termination element 420 (set to 50 Ω) was providing bus termination. The results of the write operations at 800 Mbps to device $412_a$ are illustrated in FIG. 7a, device $412_b$ are illustrated in FIG. 7b, device $412_c$ are illustrated in FIG. 7c and device $412_d$ are illustrated in FIG. 7d. The results of the write operations at 1064 Mbps to device $412_a$ are illustrated in FIG. 8a, device $412_b$ are illustrated in FIG. 8b, device $412_c$ are illustrated in FIG. 8c and device $412_d$ are illustrated in FIG. 8d.

The system 400 in the above write operation examples exhibited the following characteristics. At 800 Mbps, when using the first overdrive threshold of 0.2 volts for write operations, the aperture times were 1.02 ns, 0.91 ns, 0.94 ns, and 0.92 ns respectively to the four devices 412. When using the second overdrive voltage threshold of 0.25 volts for write operations, the aperture times of 0.96 ns, 0.83 ns, 0.88 ns, and 0.83 ns respectively from the four devices 412. At 1064 Mbps, when using the first overdrive threshold of 0.2 volts for write operations, the aperture times were 0.81 ns, 0.71 ns, 0.69 ns, and 0.67 ns respectively to the four devices 412. When using the second overdrive voltage threshold of 0.25 volts for write operations, the aperture times of 0.75 ns, 0.67 ns, 0.61 ns, and 0.61 ns respectively from the four devices 412. These values indicate a substantially good signal integrity for the system 400 in these examples.

Figure 9B:
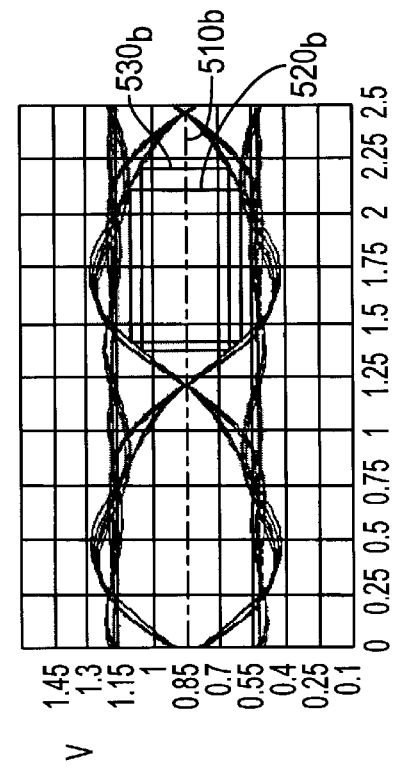
Figure 9D:
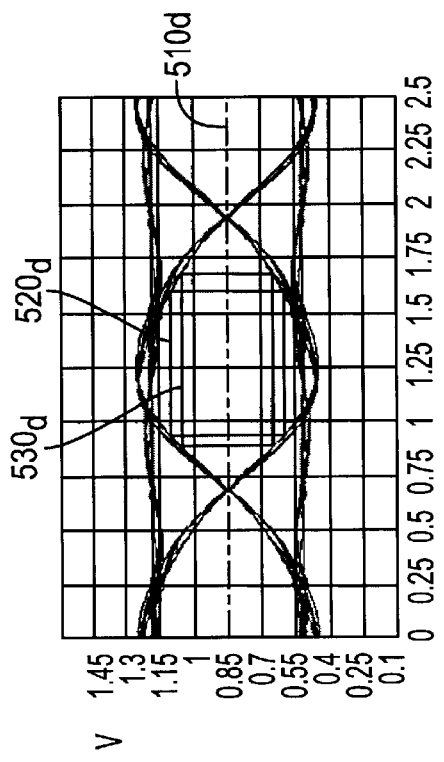
Figure 9A:
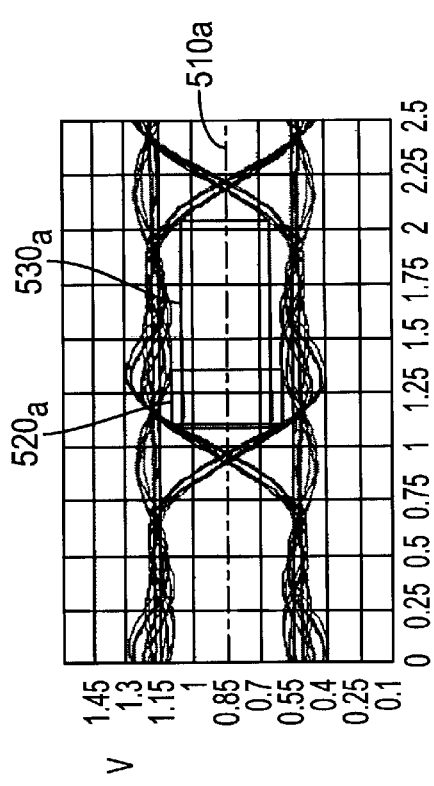
Figure 9C:
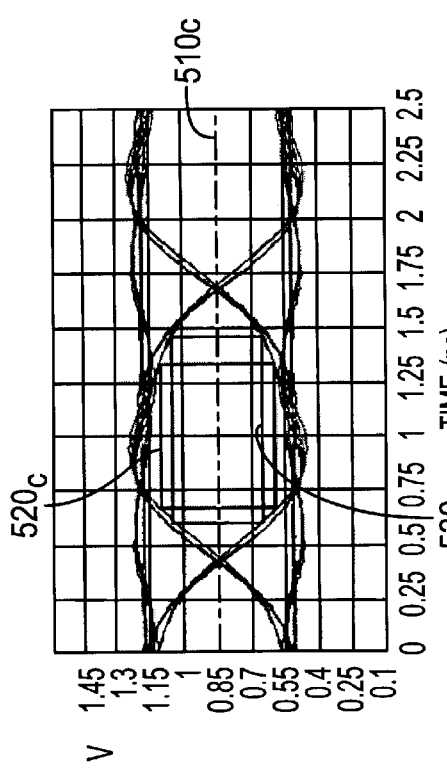
Figure 10A:
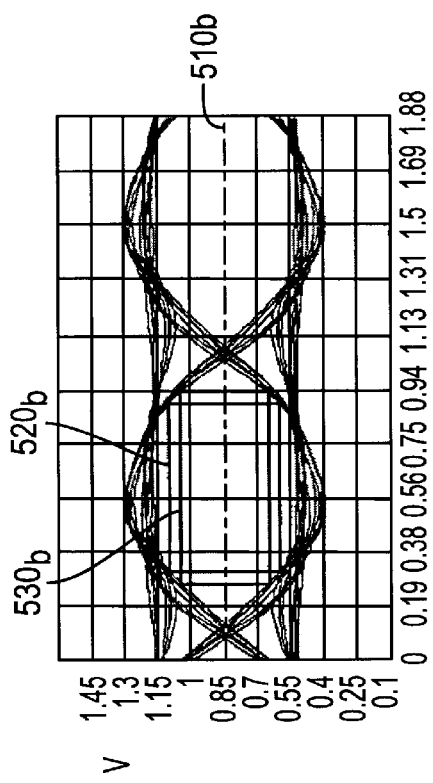
Figure 10B:
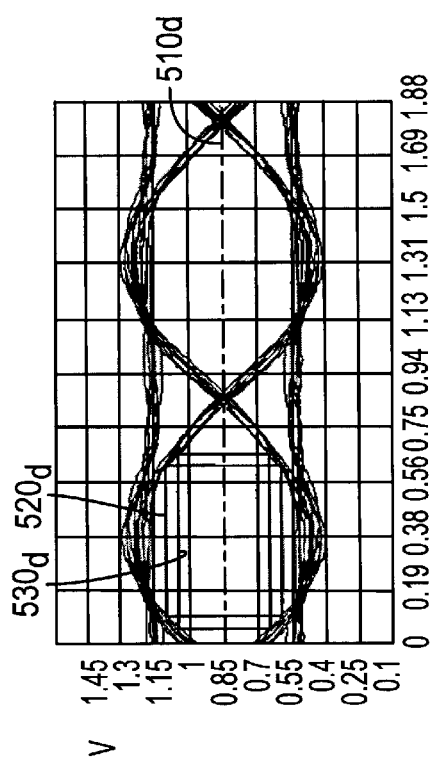
Figure 10C:
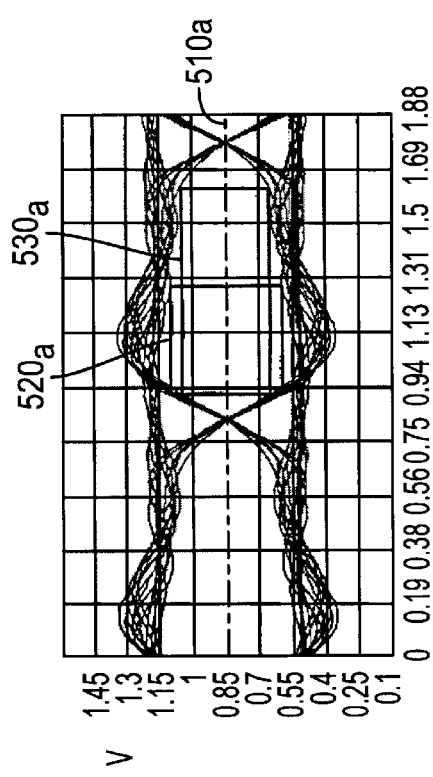
Figure 10D:
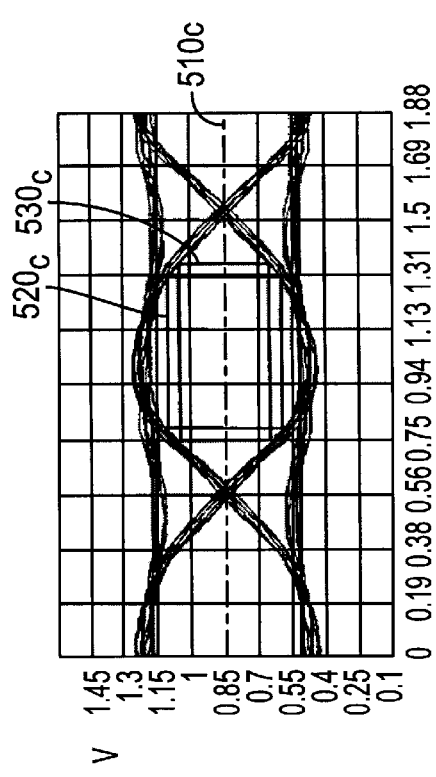

FIGS. 9a–9d and 10a–10d are signal plots respectively showing aperture widths during write operations performed by the memory controller 410 in third and fourth examples. The third and fourth examples are substantially similar to the first and second write operation examples, except that the controller 410 enabled the termination prior to performing the write operations. Thus, during the write operations, both the controller 410 and the passive termination element 420 were providing 50 Ω bus termination. The results of the write operations at 800 Mbps to device $412_a$ are illustrated in FIG. 9a, device $412_b$ are illustrated in FIG. 9b, device $412_c$ are illustrated in FIG. 9c and device $412_d$ are illustrated in FIG. 9d. The results of the write operations at 1064 Mbps to device $412_a$ are illustrated in FIG. 10a, device 412b are illustrated in FIG. 10b, device $412_c$ are illustrated in FIG. 10c and device $412_d$ are illustrated in FIG. 10d.

The system 400 in these write operation examples exhibited the following characteristics. At 800 Mbps, when using the first overdrive threshold of 0.2 volts for write operations, the aperture times were 0.96 ns, 0.83 ns, 0.86 ns, and 0.79 ns respectively to the four devices 412. When using the second overdrive voltage threshold of 0.25 volts for write operations, the aperture times of 0.25 ns, 0.69 ns, 0.67 ns, and 0.67 ns respectively from the four devices 412. At 1064 Mbps, when using the first overdrive threshold of 0.2 volts for write operations, the aperture times were 0.71 ns, 0.67 ns, 0.61 ns, and 0.61 ns respectively to the four devices 412. When using the second overdrive voltage threshold of 0.25 volts for write operations, the aperture times of 0.35 ns, 0.58 ns, 0.52 ns, and 0.52 ns respectively from the four devices 412. A comparison of the results of the first and second write operation examples (no controller termination) to the results of the third and fourth write operation examples (50 Ω controller termination) reveals that system 400 operates in substantially the same manner. In fact, the results of the first and second write operation examples (no controller termination) reveal that the system 400 exhibited better characteristics without controller termination.

Thus, the many embodiments of the invention provide a termination scheme for a multidrop system that improves signal integrity on the system transmission line, yet does not substantially increase the cost of the system. Moreover, the embodiments of the invention provide a termination scheme in a multidrop system that improves signal integrity on the system transmission line, yet does not take up substantial space on the system PCB.

It should be noted that bus termination by the system devices can be enabled or disabled by any method capable of detecting when information is going to be received or transmitted. These methods can include the detection/issuance of a command, status indication or the actual data transfer. It should also be appreciated that when termination is enabled at both ends of the multidrop bus, signal reflections are substantially reduced, and the system can use low impedance voltage mode drivers to drive information from an intermediate location on the bus. It should also be apparent that each device in a single system could implement a different active termination circuit (i.e., circuit 120, 220, 330) than the other devices in the system.

While the invention has been described and illustrated with reference to exemplary embodiments, many variations can be made and equivalents substituted without departing from the spirit or scope of the invention. Accordingly, the invention is not to be understood as being limited by the foregoing description, but is only limited by the scope of the appended claims.

What is claimed as new and desired to be protected by Letters Patent of the United States is:

1. A multidrop memory system comprising:
a transmission line; and
a plurality of memory devices connected to said transmission line, at least one of said memory devices comprising a termination circuit for selectively enabling and disabling termination of said transmission line,
wherein said at least one memory device enables and disables the termination of said transmission line based on communication traffic on said transmission line and the termination circuit is adjustable such that when it is enabled it substantially optimizes termination of said transmission line for different loading in said system.

2. The system of claim 1 wherein each memory device comprises said termination circuit for selectively enabling and disabling termination of said transmission line.

3. The system of claim 1 further comprising a passive termination element connected to a first end of said transmission line.

4. The system of claim 3 wherein one of said at least one memory device comprising said termination circuit is connected to a second end of said line.

5. The system of claim 4 wherein said memory device connected to said second end of said line is a memory controller.

6. The system of claim 4 wherein said memory device connected to said second end of said line is a central processing unit.

7. The system of claim 3 wherein said passive termination element is a resistor.

8. The system of claim 1 wherein one of said memory devices comprises a passive termination element and is connected to a first end of said transmission line.

9. The system of claim 8 wherein one of said at least one memory device comprising said termination circuit is connected to a second end of said line.

10. The system of claim 1 wherein said transmission line is an input/output bus.

11. The system of claim 1 wherein each memory device comprises said termination circuit for selectively enabling and disabling termination of said transmission line and wherein each device respectively provides a different termination resistance to said line when termination is enabled.

12. The system of claim 1 wherein each memory device comprises said termination circuit for selectively enabling and disabling termination of said transmission line and wherein each device respectively provides a same termination resistance to said line when termination is enabled.

13. The system of claim 1 wherein said termination circuit comprises:
a switching element responsive to a control signal; and
a resistive element connected to said line and said switching element in series, said resistive element and said switching element being coupled between a reference voltage and said transmission line.

14. The system of claim 13 wherein said resistive element is a trimmable resistor.

15. The system of claim 13 wherein said resistive element is a transistor.

16. The system of claim 1 wherein said termination circuit comprises:
a switching element responsive to a control signal, said switching element having a resistance and providing termination to said transmission line in response to the control signal.

17. The system of claim 1 wherein said termination circuit comprises:
first and second switch elements respectively responsive to first and second control signals; and
a voltage divider circuit connected between said first and second switching elements, said voltage divider being connected to said transmission line.

18. The system of claim 17 wherein said voltage divider circuit comprises two trimmable resistors.

19. The system of claim 17 wherein said first and second switching elements are transistors.

20. The system of claim 1 wherein said termination circuit comprises:
a switching element responsive to a control signal;
a transistor, said transistor having a first terminal coupled to said transmission line and a feedback circuit, a second terminal connected to said switching element and a control terminal connected to said feedback circuit.

21. A memory system comprising:
a muitidrop bus;
a memory controller, said memory controller comprising a first termination circuit coupled to said bus for selectively enabling and disabling termination of said bus; and
a plurality of memory devices connected to said bus, at least one of said memory devices comprising a second termination circuit for selectively enabling and disabling termination of said bus,
wherein said controller uses said first termination circuit to enable and disable the termination of said bus based on a direction of information on said bus, said at least one memory device uses said second termination circuit to enable and disable the termination of said bus based on information traffic on said bus and each termination circuit is adjustable such that when it is enabled it substantially optimizes termination of said bus for different loading in said system.

22. The system of claim 21 wherein each memory device comprises said second termination circuit for selectively enabling and disabling termination of said transmission bus.

23. The system of claim 21 further comprising a passive termination element connected to a first end of said bus.

24. The system of claim 23 wherein said controller is connected to a second end of said bus.

25. The system of claim 23 wherein said passive termination element is a resistor.

26. The system of claim 21 wherein one of said memory devices comprises a passive termination element and is connected to a first end of said bus and said controller is connected to a second end of said bus.

27. The system of claim 21 wherein said bus is an input/output bus.

28. The system of claim 21 wherein said bus is a command/address bus.

29. The system of claim 21 wherein each memory device comprises said second termination circuit for selectively enabling and disabling termination of said bus and wherein each device respectively provides a different termination resistance to said bus when termination is enabled.

30. The system of claim 21 wherein each memory device comprises said second termination circuit for selectively enabling and disabling termination of said bus and wherein each device respectively provides a same termination resistance to said bus when termination is enabled.

31. The system of claim 21 wherein one of said first and second termination circuits comprises:
   a switching element responsive to a control signal; and
   a resistive element connected to said bus and said switching element in series, said resistive and switching elements being coupled between a reference voltage and said bus.

32. The system of claim 21 wherein one of said first and second termination circuit comprises:
   a switching element responsive to a control signal, said switching element having a resistance and providing termination to said transmission line in response to the control signal.

33. The system of claim 21 wherein one of said first and second termination circuits comprises:
   first and second switch elements respectively responsive to first and second control signal; and
   a voltage divider circuit connected between said first and second switching elements, said voltage divider being connected to said bus.

34. The system of claim 21 wherein one of said first and second termination circuits comprises:
   a switching element responsive to a control signal;
   a transistor, said transistor having a first terminal coupled to said bus and a feedback circuit, a second terminal connected to said switching element and a control terminal connected to said feedback circuit.

35. A processor system comprising:
   a processor;
   a plurality of memory devices coupled to said processor via a transmission line; and
   a passive termination element coupled to a first end of the transmission line,
      wherein said processor comprises means for selectively enabling and disabling termination to the transmission line and said means is adjustable such that when termination is enabled said means substantially optimizes termination of said transmission line for different loading in said system.

36. A method of operating a multidrop memory system having a plurality of memory devices connected to a transmission line, said method comprises the steps of:
   providing each memory device with a termination circuit coupled to the transmission line;
   calibrating each termination circuit so that when enabled each termination circuit provides substantially optimal termination to the transmission line;
   determining for each memory device whether termination of the transmission line is required; and
   controlling each termination circuit to enable termination of the transmission line if it is determined that termination is required and to disable termination of the transmission line if it is determined that termination is not required,
      wherein said determination step is performed based on at least one of a location of the memory device along the transmission line and a direction of information traffic on said line.

37. The method of claim 36 wherein said calibrating step sets a termination resistance of each termination circuit to a different value.

38. The method of claim 36 wherein said calibrating step sets a termination resistance of each termination circuit to a same value.

39. The method of claim 36 wherein said calibrating step sets at least two termination resistances of at least two termination circuits to different values.

40. The method of claim 36 wherein said calibrating step sets at least two termination resistances of at least two termination circuits to same values.

41. The method of claim 36 wherein said calibrating step comprises compensating for process, voltage and temperature variations of circuitry within each termination circuit.

42. The method of claim 36 wherein said calibrating step comprises increasing and decreasing a drive strength of circuitry within each termination circuit.

43. The method of claim 36 wherein said calibrating step comprises a static calibration process.

44. The method of claim 36 wherein said calibrating step comprises a dynamic calibration process.

45. The method of claim 36 said calibrating step is performed during a manufacturing process of each termination circuit.

46. The method of claim 36 wherein said calibration step sets resistances of the termination circuits such that the resistances have a value that shifts a midpoint logic voltage on the bus from a nominal termination voltage when termination is disabled.

47. The method of claim 36 wherein termination is enabled in at least one memory device and disabled in at least one other memory device.

48. A method of operating a multidrop memory system having a controller coupled to a first end of a bus and a plurality of devices connected between the first end and a second end of the bus, said method comprising the steps of:
   providing the controller with a termination circuit coupled to the bus;
   calibrating the termination circuit so that when it is enabled the termination circuit provides substantialy optimal termination to the bus;
   providing a passive termination element at the second end of the bus;
   determining whether termination of the bus is required; and
   controlling the termination circuit to enable termination of the bus if it is determined that termination is required.

49. The method of claim 48 further comprising the step of controlling the termination circuit to disable termination of the bus if it is determined that termination is not required.

50. The method of claim 48 wherein said determination step is performed based on a direction of information traffic on the bus.

* * * * *